(12) United States Patent
Nuijten

(10) Patent No.: US 6,507,299 B1
(45) Date of Patent: Jan. 14, 2003

(54) EMBEDDING SUPPLEMENTAL DATA IN AN INFORMATION SIGNAL

(75) Inventor: Petrus A. C. M. Nuijten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/426,519

(22) Filed: Oct. 26, 1999

(30) Foreign Application Priority Data

Oct. 29, 1998 (EP) ............................................. 98203660

(51) Int. Cl.$^7$ ............................................... H03M 3/00
(52) U.S. Cl. ........................................ 341/143; 380/203
(58) Field of Search ........................ 341/143, 61, 144; 380/203, 54, 59, 51; 399/366; 326/8; 382/238, 100

(56) References Cited

U.S. PATENT DOCUMENTS 6,173,022 B1 * 1/2001 McPherson et al. ........ 375/355
6,356,569 B1 * 3/2002 Sonalkar et al. ............. 370/545

FOREIGN PATENT DOCUMENTS

| DE | 3717315 A1 | 12/1988 | ............. H04L/7/00 |
| WO | WO9833324 | 7/1998 | ............. H04N/7/50 |

* cited by examiner

Primary Examiner—Peguy JeanPierre
(74) Attorney, Agent, or Firm—Michael E. Belk

(57) ABSTRACT

An arrangement for embedding supplemental data (e.g. a watermark W) in an information signal. In an embodiment of the invention, the arrangement comprises a conventional sigma-delta modulator for encoding an audio signal and modifying means for periodically replacing a bit of the encoded signal by a bit of the watermark. In the same manner, a sync pattern is embedded in the signal. The sync bits are embedded at a smaller distance than the watermark bits. Preferably, the sync pattern is a pattern of contiguous bits which is typically not generated by the encoder. For the sigma-delta modulator, such a pattern is a run of ones followed by a substantially equally long run of zeroes, or vice versa.

11 Claims, 2 Drawing Sheets

EMBEDDING SUPPLEMENTAL DATA IN AN INFORMATION SIGNAL

FIELD OF THE INVENTION

The invention relates to the field of watermarking of audio and video signals.

The invention relates to a method and arrangement for embedding supplemental data in an information signal. The information signal is encoded by an encoder including a feedback loop. Selected samples of the encoded signal are modified within the feedback loop to represent the supplemental data and synchronization bit pattern. The modified samples representing the supplemental data are spaced apart by at least a first number of samples.

There is a growing need to accommodate watermarks in audio and video signals. Watermarks are supplemental data messages embedded in multimedia assets, preferably in a perceptually invisible manner. They comprise information, for example, about the source or copyright status of documents and audiovisual programs. They may be used to provide legal proof of the copyright ownership, allow tracing of piracy and support the protection of intellectual property.

A known method of embedding supplemental data in an information signal as described above is disclosed in International Patent Application WO-A-98/33324. In this known method, a watermark pattern is embedded in a (sigma-)delta-modulated audio signal. Each bit of such a unit-bit coded signal is a signal sample. The watermark is embedded in the encoded audio signal by modifying selected bits thereof. For example, every $100^{th}$ bit is replaced by a bit of the watermark pattern. The step of modifying the encoded audio signal is carried out inside the feedback loop of the encoder so as to compensate the effect of the modification in subsequent encoding steps.

The known method is envisaged for recording high-quality audio on the audio version of the Digital Versatile Disk (DVD). A sampling frequency of 2,822,400 Hz (64*44, 100) will be used to yield a signal-to-noise ratio of 115 dB. Replacing every $100^{th}$ bit of the sigma-delta-modulated audio signal by a watermark bit at the expense of only 1 dB increases the quantization noise. This corresponds to a watermark bit rate of about 28000 bits per second.

The above-mentioned patent application WO-A-98/33324 also discloses an arrangement for extracting the watermark. The arrangement includes a divider stage and a sync detector. The divider stage divides the bit rate by the number of bits by which the watermark bits are spaced apart (e.g. 100 if every $100^{th}$ bit of the signal is a supplemental data bit). The sync detector changes the phase of the divider stage until a synchronization bit pattern (hereinafter sync pattern for short) is detected in the bit stream.

It will be appreciated that the sync detector necessarily includes a shift register (or serial-to-parallel converter) to store a portion of the bit stream. In the known method, the sync pattern is accommodated in the watermark, i.e. the sync pattern bits are spaced apart by the same number of bits as the watermark bits. This requires a long shift register in practice. The length of the shift register depends on the length of the sync pattern and the distance between the watermark bits. If every $M^{th}$ bit of the signal is a supplemental data bit and the sync pattern comprises N bits, the sync detector must necessarily store $(N-1) \cdot M+1$ bits.

German Patent Application DE-A-37 17 315 discloses such a known sync detector in more details. In this publication, every $15^{th}$ bit of a signal is a supplemental bit and the sync pattern is a 4-bit word. In accordance therewith, the serial-to-parallel converter (reference numeral 5 in FIG. 2 of DE-A-37 17 315) holds 46 bits.

The above citations are hereby incorporated whole by reference.

SUMMARY OF THE INVENTION

It is an object of the invention to provide a method of embedding supplemental data in an information signal, which allows the supplemental data to be extracted in a more cost-effective manner.

To this end, in the method in accordance with the invention the step of modifying includes spacing apart the modified samples representing the synchronization bit pattern at most by a second number of samples which is substantially smaller than the first number of samples.

The length of the shift register in the sync detector is now determined by the sync pattern length and the second number of bits. The second number can be chosen to be independent of the first number and may be arbitrarily small or even zero. In the latter case, the sync pattern bits are successive bits of the encoded signal. The length of the shift register then corresponds to the length of the sync pattern.

In a preferred embodiment of the invention, the synchronization bit pattern is a bit pattern which is typically not generated by the encoder. The sigma-delta modulator, for example, which is envisaged for recording high-quality audio on DVD, produces a bit stream with a high-frequency pattern of zeroes and ones. The modulator tries to alternate the output bits as fast as possible so as to move quantization errors out of the audio band. Typically, the sigma-delta modulator does not produce a large number of ones followed by a large number of zeroes. For example, the bit pattern 11110000 has not been found in recordings of music. Forcing the modulator to generate such an atypical or non-characteristic pattern within the feedback loop causes the modulator to rapidly change the bit stream to the high-frequency pattern mentioned above. Such an atypical pattern is an excellent candidate for constituting the sync pattern.

DESCRIPTION OF EMBODIMENTS

Figure 1:
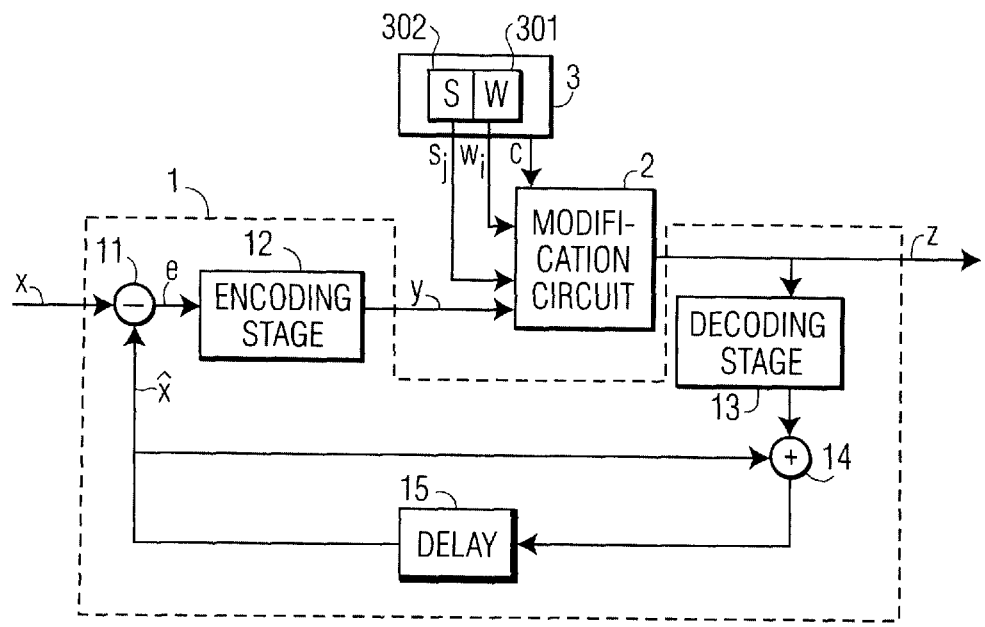
FIG. 1 shows a generic schematic diagram of an arrangement for embedding supplemental data in an information signal in accordance with the invention.

FIG. 1 shows a generic schematic diagram of an arrangement for embedding supplemental data in an information signal in accordance with the invention. The arrangement includes a predictive encoder 1, a modification circuit 2 and a control circuit 3.

The predictive encoder 1 receives an (analog or digital) input signal x and includes a subtracter 11 for subtracting a prediction signal $\hat{x}$ from the input signal x. A prediction error signal e thus obtained is applied to an encoding stage 12. The predictive encoder further includes a feedback path for obtaining the prediction signal $\hat{x}$, including a decoding stage 13, an adder 14 and a delay 15. Various embodiments of the predictive encoder 1 are known in the art, such as delta modulators, sigma-delta modulators, differential pulse code modulators, or MPEG video encoders.

The modification circuit 2 receives the encoded error signal y and is arranged to modify selected samples of this signal. The modification circuit is located between encoding stage 12 and the feedback path 13–15, i.e. inside the loop of the encoder 1. The prediction signal $\hat{x}$ is thus derived from the modified encoded signal z instead of the unmodified encoded signal y. Any coding "error" introduced by modification stage 2 is thus fed back to the encoding stage 12, resulting in the coding error being subsequently encoded in such a way that its effect is compensated.

The modified encoded signal z is applied to a receiver or stored on a storage medium (not shown). It is important to note that the receiver may or may not have an arrangement for extracting the supplemental data. A conventional receiver, which does not have such an arrangement, must be capable of decoding and reproducing the modified encoded signal. Thus, the supplemental data must be embedded in an unobtrusive manner. Receivers for decoding and reproducing the encoded signal from encoders as shown in FIG. 1 are generally identical to the feedback path (13–15) of the encoders and therefore not separately shown.

Figure 2:
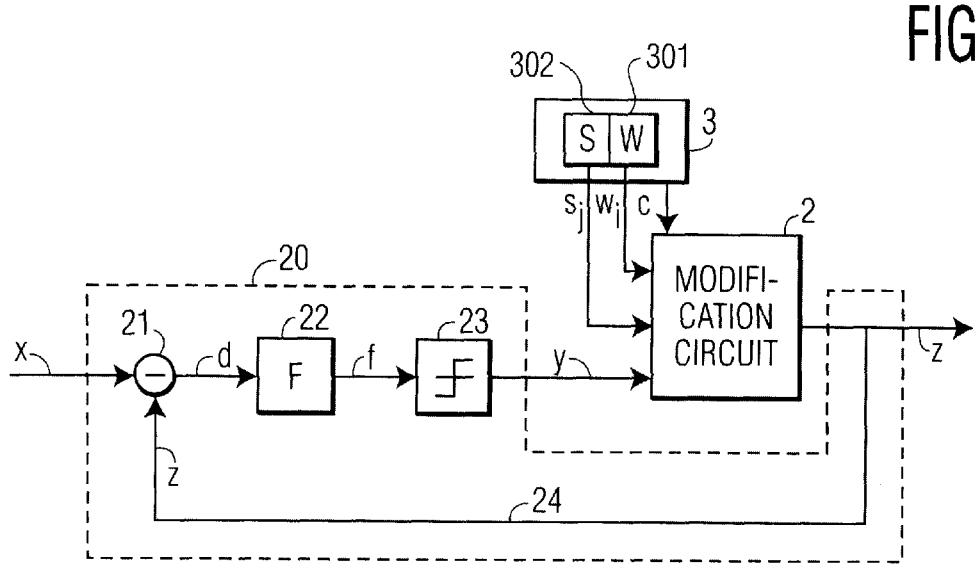
FIG. 2 shows a schematic diagram of a sigma-delta modulator in accordance with the invention.

The invention will be further explained with reference to FIG. 2, which shows an arrangement for embedding supplemental data in a sigma-delta-modulated signal. The arrangement includes a conventional sigma-delta modulator 20 including a subtracter 21, a loop filter 22, a polarity detector 23 and a feedback path 24. The subtracter 21 subtracts the encoded output signal z (having a level of +1V or −1V) from the input signal x. The difference signal d is filtered by the filter 22. The filtered signal f is applied to the polarity detector 23 which produces, at a rate determined by a sampling frequency $f_s$ (not shown), an output bit "1" (+1V) for f>0 or "0" (−1V) for f<0.

The modification circuit 2 is connected between the polarity detector 23 and the feedback path 24. In response to a control signal c supplied by the control circuit 3, the modification circuit (a multiplexer) replaces selected bits of the encoded signal y by a watermark bit $w_i$ or a sync pattern bit $s_j$. The watermark W and sync pattern S are stored in registers 301 and 302, respectively, of the control circuit 3. The operation of the control circuit will be apparent from the description that follows.

Figure 3:
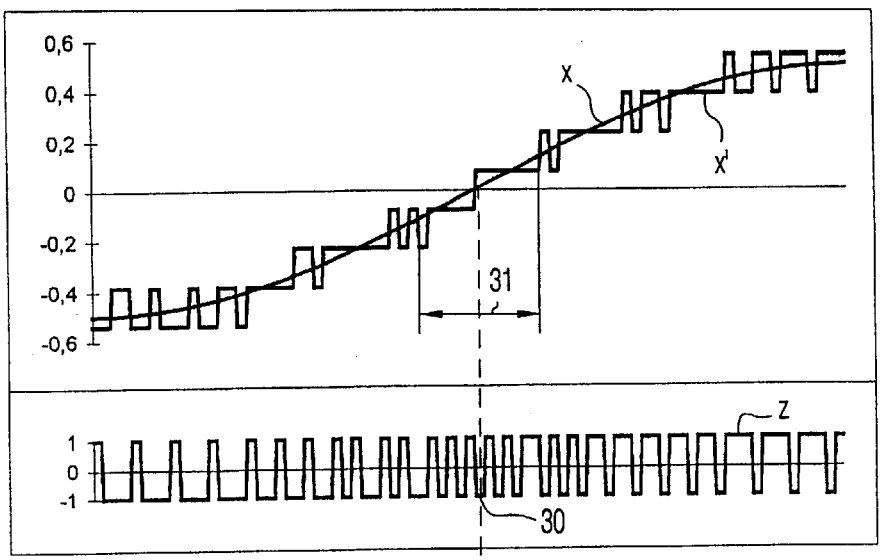

FIG. 3 shows waveforms to explain the operation of the arrangement if the modification circuit 2 is inactive. More in particular, the Figure shows an input signal x and the output signal z (which is the same as the encoded signal y because the modification circuit is inactive). The sigma-delta modulator produces more positive samples as the input signal becomes larger. As the Figure shows, an input voltage of −0.5V is encoded as a bit sequence 0001 (three −1V pulses and one +1V pulse), an input voltage of 0V is encoded as a high-frequency bit pattern 01010 (alternating −1V and +1V pulses), and an input voltage of +0.5V is encoded as a bit sequence 1110 (three +1V pulses and one −1V pulse). It is important to note that pairs of long runs of zeroes and long runs of ones do not occur.

The bit stream z is decoded at the receiving end (not shown) by reshaping the received pulses and passing them through a low-pass filter. In this simplified example, the signal is demodulated by averaging 13 samples of the bit stream. The demodulated signal x' is also shown in FIG. 3, apart from a time delay caused by said low-pass filter operation. In the Figure, the demodulated signal x' is thus time-aligned with the input signal x.

Figure 4:
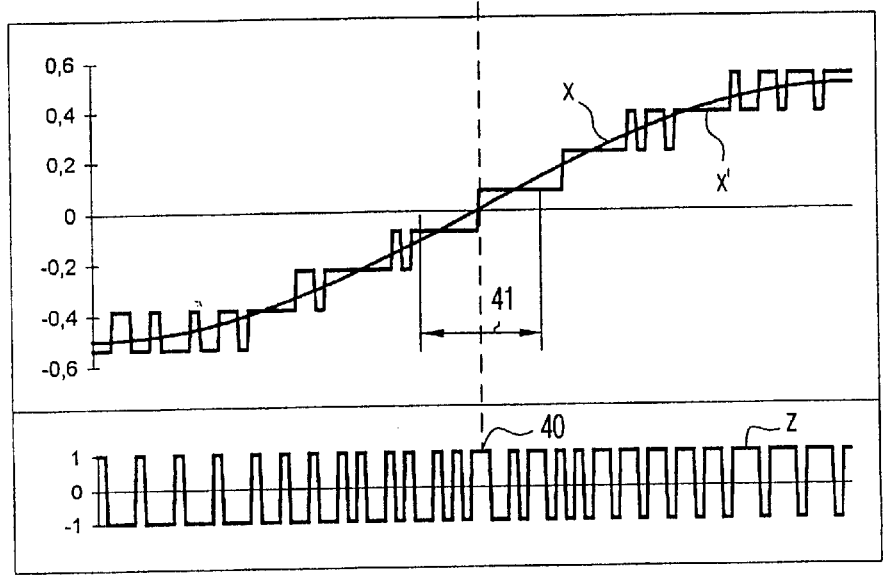

FIG. 4 shows waveforms to explain the operation of the arrangement if the modification circuit 2 is active. In the example, a "−1" sample 30 (FIG. 3) of the sigma-delta modulator has been replaced by a "+1" sample 40 so as to represent a watermark bit $w_i$=1. Because the modification is fed back to the input, the adverse effect of the modification will subsequently be compensated by the encoding stage. Thus, a portion of the encoded signal z immediately following the supplemental data bit 40 differs from the corresponding portion shown in FIG. 3. In accordance therewith, the demodulated signal x' in FIG. 4 is also temporarily different from the same signal in FIG. 3. Note that the time alignment in the Figures causes the difference to become already manifest before the supplemental data bit 40 is embedded. In FIGS. 3 and 4, the relevant portions of the demodulated signal are denoted 31 and 41, respectively.

As will be appreciated from a comparison of FIGS. 3 and 4, the difference is hardly noticeable in practice. A sigma-delta modulator for encoding high-quality audio signals at a sampling frequency $f_s$=2,822,400 Hz (64*44,100) has a signal-to-noise ratio of 115 dB. It has been found that replacing 1 sample per 100 samples increases the quantization noise by only 1 dB. Note that pairs of long runs of zeroes and long runs of ones still do not occur when a supplemental data bit has been inserted. It is this property which allows a sync pattern to be embedded in the bit stream which can be reliably detected at the receiving end.

Figure 5:
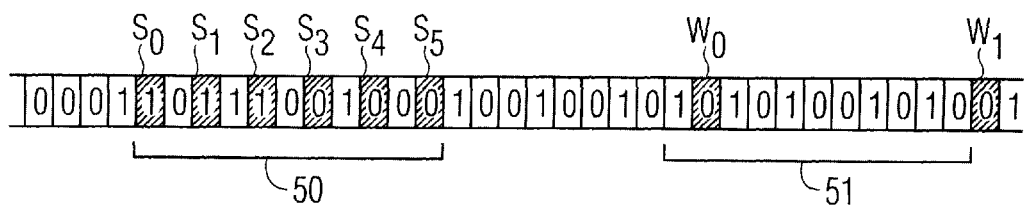
FIGS. 3–6 show waveforms to explain the operation of the arrangement which is shown in FIG. 2.

The bits $s_j$ of the sync pattern S are inserted in the same manner. In accordance with the invention, the distance between successive sync bits $s_j$ is thereby substantially shorter than the distance between successive bits $w_i$ of the watermark W. FIG. 5 shows a simplified example of an audio bit stream thus obtained. In this example, every $10^{th}$ bit of the bit stream is a watermark bit $w_i$. The watermark bits are thus spaced apart by 9 audio signal bits. To identify the positions of the watermark bits in the bit stream, and possibly also to identify the first bit $w_0$ of a watermarked message frame, a sync pattern S comprising 6 bits $s_0 \ldots s_5$ is accommodated in the bit stream. In the example, the sync bits $s_j$ are spaced apart by only 1 audio bit. The embedded supplemental data bits are shaded in the Figure.

A sync detector (not shown because such a detector is known per se, inter alia, from German Patent Application DE-A-37 17 315) includes a shift register which, in the present example, covers a window of 5.2+1=11 bits. In a search mote of the sync detector, the shift register is clocked at the channel bit rate. If the window includes the sync pattern S at its $1^{st}, 3^{rd}, \ldots, 11^{th}$ bit position, the sync pattern has been detected. In FIG. 5, this is denoted by window 50. In response thereto, the sync detector locks and starts a divide-by-10 counter so as to identify the positions of watermark bits $w_i$. Note that if the sync bits $s_j$ are part of the embedded watermark as taught by the prior art, i.e. if they are also spaced apart by 9 audio bits, the shift register would have to include 5.10+1=51 bits. In practice, for example, for a sigma-delta-modulated audio signal having its watermark bits spaced apart by 100 or even 1000 bits and having a long sync pattern, the shift register would be excessively large.

As shown in FIG. 5 by a further window 51, it is not to be excluded that the sync pattern S is also present elsewhere in the bit stream. If this pattern is found in the search mode, the sync detector will falsely lock and the watermark will not be extracted correctly. To improve the reliability, the sync pattern and the spacing of the sync pattern bits are chosen to be such that such a false lock is very unlikely to occur.

Figure 6:
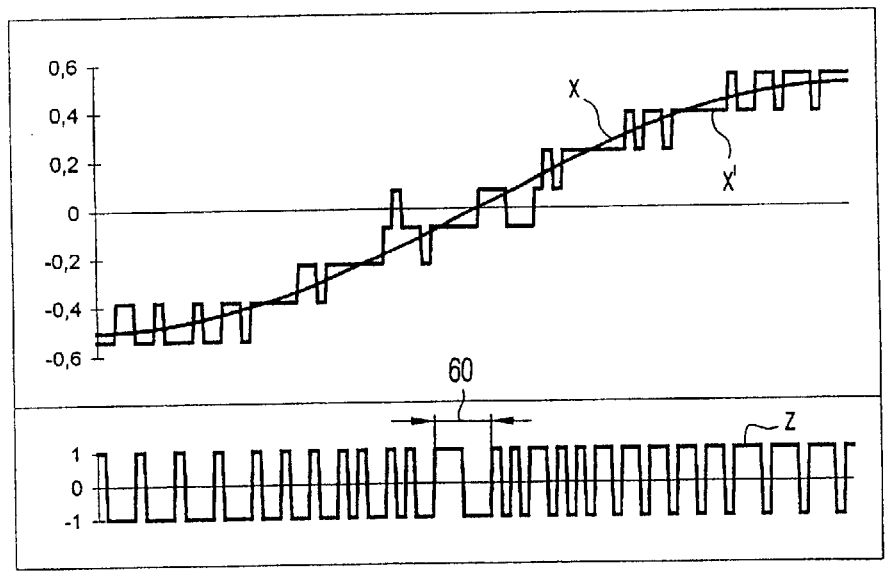

As mentioned before with reference to the description of FIGS. 3 and 4, pairs of long runs of zeroes and long runs of ones do not occur in a sigma-delta-modulated signal. If a run of ones occurs, the subsequent run of zeroes will generally have a substantially different length (and vice versa). Pairs of a run of ones and a substantially equally long run of zeroes are referred to as atypical or non-characteristic patterns. Examples in a sigma-delta modulated audio signal are 1111000, 11110000, 111100000, 1111100000 and their inverted versions. They have not been found in pieces of real audio. In a preferred embodiment of the invention, such an atypical pattern is embedded in the bit stream to constitute the sync pattern S. FIG. 6 shows waveforms to explain the operation of the arrangement, if the sync pattern 111000 (denoted by reference numeral 60) is inserted in the bit stream. The same waveforms as in FIGS. 3 and 4 are shown. As can be seen in the Figure, the demodulated signal x' is considerably affected. However, this is a simplified example. It has been found that the distortion is hardly noticeable in practice.

If necessary, the adverse effect of the sync pattern insertion can be mitigated. For example, one or more bits preceding the sync pattern can be "pre-modified" in such a way that the error is reduced. This is achieved by looking ahead which "pre-modification" yields the best encoding quality. This concept has been proposed in Applicant's non-published European patent Application 97204056.2 (PHN 16.669) Ser. No. 09/211,928, filed Dec. 15, 1998. An alternative is to evaluate the adverse effect of the sync pattern insertion in terms o, for example, signal-to-noise ratio and postpone the sync pattern insertion until a place in the bit stream is found where said signal-to-noise ratio is deemed acceptable.

In summary, an arrangement for embedding supplemental data (e.g. a watermark W) in an information signal (x) is disclosed. In an embodiment of the invention, the arrangement includes a conventional sigma-delta modulator (20) for encoding an audio signal (x) and modifying apparatus (2) for periodically replacing a bit of the encoded signal (y) by a bit ($w_i$) of the watermark. In the same manner, a sync pattern (S) is embedded in the signal. The sync bits ($s_i$) are embedded at a smaller distance than the watermark bits. Preferably, the sync pattern is a pattern of contiguous bits which is typically not generated by the encoder. For the sigma-delta modulator, such a pattern is a run of ones followed by a substantially equally long run of zeroes, or vice versa.

What is claimed is:

1. A method comprising the steps of:
    encoding an information signal;
    modifying, selected samples of the encoded signal to represent supplemental data and a synchronization bit pattern, the modified samples representing the supplemental data being spaced apart by at least a first number of samples, the modified samples representing the synchronization bit pattern being spaced apart by at most a second number of samples which is substantially smaller than the first number of samples;
    feeding back the encoded signal with the modified samples to control the encoding.

2. The method of claim 1, wherein the modified samples representing the synchronization bit pattern are successive samples of the modified encoded signal.

3. An encoded signal produced by the method of claim 1 with selected samples of the encoded signal being modified to represent embedded supplemental data and a synchronization bit pattern, the modified samples representing the supplemental data being spaced apart by at least a first number of samples, the modified samples representing the synchronization bit pattern being spaced apart at most by a second number of samples which is substantially smaller than the first number of samples.

4. The signal of claim 3, wherein the synchronization bit pattern is a pattern of successive samples which is typically not generated by the encoding.

5. The signal of claim 3, wherein the information signal is a sigma-delta-modulated audio signal and the synchronization bit pattern includes a run of two or more consecutive ones and a substantially equally long run of consecutive zeroes.

6. The storage medium produced by recording thereon the signal of claim 3.

7. The method of claim 1, wherein the synchronization bit pattern is a bit pattern which is typically not generated by the encoder.

8. The method of claim 1, wherein the encoder is a sigma-delta modulator.

9. The method of claim 1, wherein the synchronization bit pattern includes a run of two or more consecutive ones and a substantially equally long run of zeroes.

10. The method of claim 1, wherein the synchronization bit pattern is 1111000, 11110000, 111100000, 1111100000 or the inverted version thereof.

11. An arrangement comprising:
    an encoder for encoding an information signal;
    means for modifying selected samples of the encoded signal to represent supplemental data and a synchronization bit pattern, the modified samples representing the supplemental data being spaced apart by at least a first number of samples, the modified samples representing the synchronization bit pattern being spaced apart at most by a second number of samples which is substantially smaller than the first number of samples;
    means for feeding back the encoded signals with the modified samples to control the encoding.

* * * * *